United States Patent [19]
Walters et al.

[11] Patent Number: 5,982,160
[45] Date of Patent: Nov. 9, 1999

[54] DC-TO-DC CONVERTER WITH INDUCTOR CURRENT SENSING AND RELATED METHODS

[75] Inventors: Michael M. Walters, Raleigh; Charles E. Hawkes, Cary, both of N.C.

[73] Assignee: Harris Corporation, Palm Bay, Fla.

[21] Appl. No.: 09/220,780

[22] Filed: Dec. 24, 1998

[51] Int. Cl.$^6$ ....................................................... G05F 1/40
[52] U.S. Cl. ............................................. 323/282; 323/222
[58] Field of Search .................................... 323/222, 224, 323/282, 285, 288

[56] References Cited

U.S. PATENT DOCUMENTS

| | | | |
|---|---|---|---|
| 4,524,412 | 6/1985 | Eng ............................................. | 363/56 |
| 4,553,084 | 11/1985 | Wrathall .................................... | 323/316 |
| 4,672,303 | 6/1987 | Newton ..................................... | 323/285 |
| 5,101,335 | 3/1992 | Ludden et al. ............................ | 363/21 |
| 5,111,133 | 5/1992 | Poulo et al. .............................. | 323/286 |
| 5,132,894 | 7/1992 | Rozman et al. ........................... | 363/51 |
| 5,189,601 | 2/1993 | Sellers ...................................... | 363/21 |
| 5,418,709 | 5/1995 | Lukemire .................................. | 323/222 |
| 5,548,206 | 8/1996 | Soo .......................................... | 323/284 |
| 5,625,275 | 4/1997 | Tanikawa et al. ........................ | 320/160 |
| 5,627,460 | 5/1997 | Bazinet et al. ........................... | 323/288 |
| 5,646,513 | 7/1997 | Riggio, Jr. ................................ | 323/285 |
| 5,690,849 | 11/1997 | DeVilbiss et al. ....................... | 219/497 |
| 5,717,322 | 2/1998 | Hawkes et al. .......................... | 323/283 |
| 5,723,974 | 3/1998 | Gray ......................................... | 323/282 |
| 5,747,977 | 5/1998 | Hwang ..................................... | 323/284 |
| 5,793,193 | 8/1998 | Hodgins ................................... | 323/284 |
| 5,805,433 | 9/1998 | Wood ....................................... | 363/16 |

OTHER PUBLICATIONS

Harris Product Sheet, HIP6011, "Buck Pulse–Width Modulator (PWM) Controller and Output Voltage Monitor", File No. 4409, Sep. 1997, pp. 1 to 10.

Harris Product Sheet, HIP5061, "7A, High Efficiency Current Mode Controlled PWM Regulator", File No. 3390.2, Apr. 1994, pp. 7–53 to 7–72.

Tech Brief No. TB356, "Selecting Among HIP6004/5, HIP6004A/5A, HIP6004B15B, and HIP6014/15 for the Controller Best Suited to Your Application", Jul. 1998, pp. 1 to 2.

Maxim Product Sheet, MAX1624/MAX1625, "High–Speed Step–Down Controllers With Synchronous Rectification for CPU Power", Jun. 1997, pp. 1 to 24.

LinFinity Application Note AN–7, "A Simple Current–Sense Technique Eliminating a Sense Resistor", Jul. 1998, pp. 1 to 6.

Harris Product Sheet, HIP5020, "Integrated–Power Buck Converter Controller With Synchronous Rectification", File No. 4243 Jan. 1997, pp. 1 to 16.

*Primary Examiner*—Adolf Deneke Berhane
*Attorney, Agent, or Firm*—Allen, Dyer, Doppelt, Milbrath & Gilchrist, P.A.

[57] ABSTRACT

A DC-to-DC power converter includes at least one power switch, a pulse width modulation circuit for generating control pulses for the at least one power switch, an output inductor connected to the at least one power switch, and a current sensor connected in parallel with the inductor for sensing current passing through the inductor. The current sensor preferably includes a resistor and a capacitor connected together in series. The current sensor is connected to a peak current control loop circuit cooperating with the pulse width modulation circuit for controlling the at least one power switch responsive to the current sensor. The resistor and capacitor preferably have respective values so that the current sensor is a substantially instantaneous current sensor. The output inductor has an inductance and a direct current (DC) resistance defining a first time constant. In one embodiment, the resistor and capacitor of the current sensor define a second time constant within a predetermined range of each other. In another embodiment, the resistor and capacitor of the current sensor define a second time constant substantially equal to the first time constant.

35 Claims, 1 Drawing Sheet

DC-TO-DC CONVERTER WITH INDUCTOR CURRENT SENSING AND RELATED METHODS

FIELD OF THE INVENTION

The present invention relates to the field of electronic circuits, and, more particularly, to a DC-to-DC converter and associated methods.

BACKGROUND OF THE INVENTION

DC-to-DC power converters are widely used to supply power to electronic devices, such as in computers, printers, and other devices. Such DC-to-DC converters are available in a variety of configurations for producing the desired output voltage from a source voltage. For example, a buck or step down converter produces an output voltage that is less than the source voltage. A typical step down converter includes one or more power switches which are pulse width modulated to connect the source voltage to an output inductor to thereby power the load.

For example, the HIP5061 converter offered by the assignee of the present invention is a complete power control integrated circuit incorporating both the high power DMOS transistor, CMOS logic and low level analog circuitry on the same IC. The converter includes a gate driver for the high side switch, and a high speed peak current control loop. A portion of the converter's DC output is applied to a transconductance error amplifier that compares the fed back signal with an internal reference. The feedback signal is generated by a resistor divider connected across the output of the converter.

The output of the error amplifier is also brought out at a terminal to provide for soft start and frequency compensation of the control loop. This same signal is applied internally to program the peak high side switch drain current. To assure precise current control, the response time of the peak current control loop is less than 50 ns.

The transconductance error amplifier compares the DC level of the fed back voltage with an internal reference, while providing voltage loop compensation using external resistors and capacitors. The error amplifier output is converted into a current to program the required peak high side switch current that produces the desired output voltage. When the sum of the sensed high side switch current and the compensating ramp exceed the error current signal, a latch is reset and the high side switch is turned off. Current comparison around this loop takes place in less than 50 ns, thereby allowing for excellent 250 KHz converter operation.

A signal proportional to the output inductor's current may be used to limit component stress during output overloads (overload protection). However, a regulation application needs a higher fidelity current signal than the overload protection application. Typically the heat sinks and thermal design of the DC-to-DC converter are sized for efficiency, and the worst case variation of the overload trip level (current signal) still maintains the components below their maximum ratings. Unfortunately, the waveshape may not be suitable for regulation, and any sensing circuit bandwidth must be sufficient in view of the switching frequency.

Perhaps the most common approach to sensing the output inductor current in a buck converter uses a sensing resistor connected in series with the output inductor. The circuit reconstructs the output inductor current as a differential voltage across the sensing resistor. Most IC's using this approach regulate the output voltage with current mode control and use the signal for output voltage feedback.

The sensing resistor value must be large enough to keep the sensed signal above the noise floor and yet small enough to avoid excessive power dissipation. This approach has the obvious efficiency drawback with high output current. In other words, power is unnecessarily dissipated by the sensing resistor, especially since the power dissipated increases with the square of the inductor current. For some applications, the value of the sensing resistor may be close to the same resistance as the MOSFET's on resistance.

In another variation of the sensing circuit, the sensing resistor is connected in series with the drain of the upper MOSFET as disclosed, for example, in the MAXIM MAX1624/MAX1625 data sheets. This has the advantage of reducing the power dissipated in the sensing resistor with a large signal (large resistor value).

Unfortunately, this sensing resistor location creates other problems that can lead to a less robust design. The main problem is that the upper MOSFET's drain current is discontinuous. Every time the upper MOSFET turns on, the current starts at zero and increases rapidly with a steep slope. Additionally, the current waveshape exceeds the inductor current for the time interval necessary to replenish the charge of the lower MOSFET and/or diode junction capacitances. The control IC must first ignore the additional initial current and wait for the signal to settle. This may cause control loop problems and limit the input-to-output range of the converter.

Yet another approach of current sensing is illustrated by the HIP6011 converter offered by the assignee of the present invention. This converter uses the upper MOSFET's on-resistance as the current sensing element for overload protection. This IC uses voltage-mode control for output voltage regulation and can tolerate the large variation in the resistance value. However, a droop circuit may be needed that modifies the output voltage as a function of load current. The droop circuit uses the average voltage drop across the output inductor (a resistor and capacitor as a low-pass filter) to modify the output voltage regulation. The average voltage across the inductor is the DC output current multiplied by the inductor's winding resistance.

SUMMARY OF THE INVENTION

In view of the foregoing background, it is therefore an object of the present invention to provide a DC-to-DC converter and associated methods which provide for accurate sensing of the output current for regulation.

This and other objects, features and advantages in accordance with the present invention are provided by a DC-to-DC converter comprising at least one power switch, a pulse width modulation circuit for generating control pulses for the at least one power switch, an output inductor connected to the at least one power switch, and a current sensor connected in parallel with the inductor for sensing current passing through the inductor. The current sensor preferably comprises a resistor and a capacitor connected together in series. The current sensor is connected to a peak current control loop circuit cooperating with the pulse width modulation circuit for controlling the at least one power switch responsive to the current sensor. The resistor and capacitor preferably have respective values so that the current sensor is a substantially instantaneous current sensor. Accordingly, the disadvantages of the prior art inductor current sensing techniques are overcome.

The output inductor has an inductance and a direct current (DC) resistance defining a first time constant. In one embodiment, the resistor and capacitor of the current sensor define a second time constant within a predetermined range of the first time constant. The predetermined range may be plus or minus 10 percent, for example, at room temperature. In another embodiment, the resistor and capacitor of the current sensor define a second time constant substantially equal to the first time constant.

The DC-to-DC converter may also include a voltage regulation loop circuit cooperating with the peak current control loop circuit for setting a peak current level. The voltage regulation loop circuit may include a voltage divider connected to the output of the DC-to-DC converter for generating a signal related to the output voltage.

According to another aspect of the invention, the pulse width modulation circuit operates at a predetermined switching frequency. The current sensor thus preferably defines a sensing bandwidth substantially above the predetermined switching frequency.

The DC-to-DC converter may also include an overload protection circuit connected to the current sensor. In addition, the at least one power switch, in some embodiments, may include a high side power switch and a low side power switch connected together.

Another aspect of the invention relates to a method for regulating a DC-to-DC converter comprising at least one power switch, a pulse width modulation circuit for generating control pulses for the at least one power switch, an output inductor connected to the at least one power switch, and a peak current control loop circuit cooperating with the pulse width modulation circuit. The method preferably comprises the steps of: sensing current passing through the inductor using a current sensor connected in parallel with the inductor, the current sensor comprising a resistor and a capacitor connected together in series; and operating the peak current control loop circuit to control the at least one power switch responsive to the current sensor. The resistor and capacitor preferably have respective values so that the sensing step comprises sensing a substantially instantaneous current passing through the inductor.

The output inductor has an inductance and a direct current (DC) resistance defining a first time constant. In one embodiment, the method also includes the step of selecting the resistor and capacitor of the current sensor to define a second time constant within a predetermined range of the first time constant. The predetermined range may be plus or minus 10 percent at room temperature, or the first and second time constants may be substantially equal.

DETAILED DESCRIPTION OF THE PREFERRED EMBODIMENTS

Figure 1:
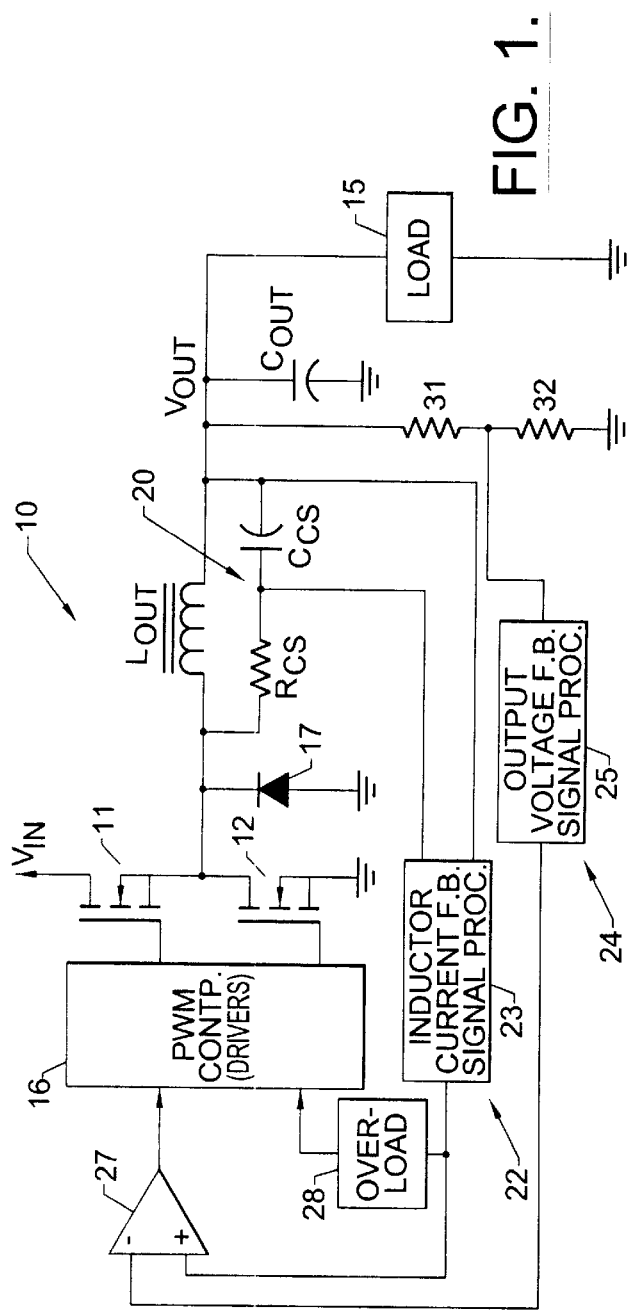
FIG. 1 is a simplified schematic circuit diagram of the DC-to-DC converter of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Turning now to the drawing figures, the DC-to-DC converter 10 in accordance with present invention is now described. The DC-to-DC converter 10 provides a controlled voltage Vout to a load 15. In the illustrated embodiment, the DC-to-DC converter 10 includes a pair of power switches, a high side switch 11, and a low side switch 12 connected to a source voltage Vin. Of course, as will be readily appreciated by those skilled in the art, the DC-to-DC converter 10 in other embodiments may include only the high side switch 11, with a diode substituted in the position of the low side switch 12. In addition, although MOSFET transistors are illustrated, other semiconductor switches may be used as will also be understood by those skilled in the art.

The DC-to-DC converter 10 also includes the schematically illustrated pulse width modulation circuit 16 which would also preferably include switch drivers. This circuit portion is more fully described, for example, in U.S. Pat. No. 5,717,322 to Hawkes et al. and U.S. Pat. No. 5,793,193 to Hodgins, both assigned to the assignee of the present invention. Both of these patents are also incorporated by reference herein in their entirety. The pulse width modulation circuit 16 generates a series of pulse width modulated control pulses for the power switches 11, 12 to regulate the output voltage Vout coupled to the load 15. Those of skill in the art will readily appreciate the construction and operation of the pulse width modulation circuit 16 without further detailed discussion.

The illustrated DC-to-DC converter 10 also includes an output inductor Lout coupled between the load 15 and a node between the high and low side switches 11, 12. A diode 17 is also connected between ground and the node between the high and low side power switches 11, 12. An output capacitor Cout is connected in parallel across the load 15 as will also be readily appreciated by those skilled in the art.

One aspect of the present invention is directed to overcoming the shortcomings of the prior art attempts to sense the current passing through the output inductor Lout. As discussed above, one prior art approach has been to place a sensing resistor in series with the output inductor Lout. This arrangement reduces the efficiency of the DC-to-DC converter.

Another prior art approach places a sensing resistor in series with the drain of the upper or high side switch. The main difficulty with such an approach is that the high side switch current is discontinuous and every time the switch turns on the current starts at zero and increases rapidly. The current waveshape exceeds the inductor current for the time interval needed to replenish the charge of the low side switch. Accordingly, for such an arrangement, the control circuit must ignore the additional initial input current and wait for the current sense signal to settle. This limits the input-to-output range of the converter.

The present invention provides a current sensor 20 connected in parallel with the output inductor Lout for sensing current passing through the inductor. The current sensor 20 preferably comprises a resistor Rcs and a capacitor Ccs connected together in series. The current sensor 20 is connected to the illustrated peak current control loop circuit 22 cooperating with the pulse width modulation circuit 16 for controlling the power switches 11, 12 responsive to the current sensor. The resistor Rcs and capacitor Ccs preferably have respective values so that the current sensor 20 is a substantially instantaneous current sensor. Accordingly, the disadvantages of the prior art inductor current sensing techniques are overcome.

In practice, all inductors include a winding that is a wire, such as copper, that surrounds a magnetic material or air.

Figure 2:
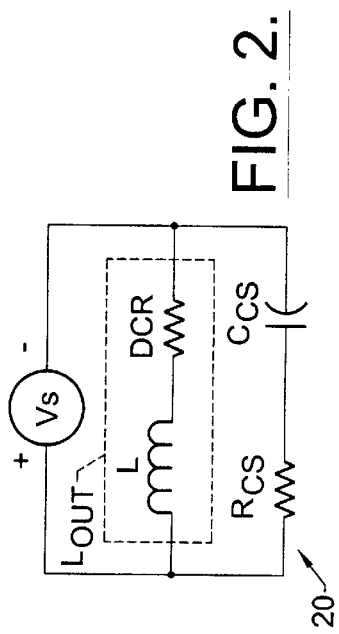
FIG. 2 is schematic circuit diagram of the inductor and inductor current sensing circuit portion shown in greater detail from FIG. 1.

This wire has a resistance per unit length that leads to a distributed resistance that can be measured at direct current (DC) as the DC resistance (DCR) of the inductor. A fairly good model of the practical inductor lumps the distributed winding resistance into a single element, DCR, that is in series with the ideal inductance L as shown in FIG. 2. Accordingly, the output inductor Lout of the DC-to-DC converter 10 can be modeled as having a pure inductance L and a DCR defining a first time constant. In one embodiment, the resistor Rcs and capacitor Ccs of the current sensor 20 define a second time constant within a predetermined range of the first time constant. The predetermined range may be plus or minus 10 percent at room temperature. In another embodiment, the resistor Rcs and capacitor Ccs of the current sensor 20 define a second time constant substantially equal to the first time constant.

In other words, the present invention provides the current sensor 20 to be an instantaneous inductor current sensor 20 with enough accuracy to be useful for peak current mode control. The present invention reconstructs the current waveform in the output inductor Lout. The invention recognizes that both a lumped-parameter model of the output inductor Lout and a resistor-capacitor network of the current sensor 20 are low-pass filters operating on the same excitation source Vs.

The output inductor current is reconstructed as a voltage across the capacitor Ccs. A straightforward analysis of the practical inductor and resistor-capacitor network indicates that both are low pass filters. However, to reconstruct the current waveform, the values of the resistor Rcs and the capacitor Ccs are preferably related to the inductor time constant as follows:

$$\frac{1}{Rcs\,Ccs} = \frac{DCR}{L}$$

where DCR/L is the inductor time constant. With this arrangement, the instantaneous voltage across the capacitor Ccs is exactly equal to the voltage across the DCR of the inductor Lout and is proportional to the instantaneous inductor current. As will be readily understood by those skilled in the art, however, the parameters of the inductor time constant are variable with temperature and load conditions. The inductance value decreases with increasing load current and the DCR increases as the inductor temperature increases. These changes may cause a slight mismatch in the time constants. However, the waveshape is preserved with normal expected variances and the control loop adjusts for any DC error.

As also shown in FIG. 1, the DC-to-DC converter 10 illustratively includes a voltage regulation loop circuit 24 cooperating with the peak current control loop circuit 22 for setting a peak current level. The peak current control loop circuit 22 is illustratively connected to the current sensor 20 as extensively described above. The current sense signal is processed through the schematically illustrated inductor current feedback signal processing circuitry 23 to properly condition the signal for application to the comparator 27. Those of skill in the art will readily appreciate the construction of the many possible and equivalent variations of the inductor current feedback signal processing circuitry 23, such as disclosed, for example, in the above cited U.S. Pat. Nos. 5,717,322 and 5,793,193.

The DC-to-DC converter 10 also illustratively includes the schematically illustrated output voltage feedback signal processing circuit 25 which will also be appreciated by those skilled in the art. The voltage feedback signal may be generated via the illustrated voltage divider provided by resistors 30, 31 as will also be readily understood by those skilled in the art. The voltage regulation loop circuit 24 effectively sets the desired peak current level which is compared with the sensed instantaneous inductor current from the sensor 20 to control the pulse width modulation controller 16.

The DC-to-DC converter also includes the overload detection circuit 28 which uses the sensed current signal from the current sensor 20 to prevent overloads as will be readily understood by those skilled in the art. The DC-to-DC converter 10 may also include additional features/circuit portions not shown for clarity including, for example, soft start and slope compensation circuit portions. The DC-to-DC converter 10 may also include a hysteretic comparator, not shown, for switching between a normal operating mode and a discontinuous low current demand mode.

According to another aspect of the invention, the pulse width modulation circuit 16 operates at a predetermined switching frequency, and the current sensor 20 defines a sensing bandwidth substantially above the predetermined switching frequency. For example, the switching frequency may be in a range of about 100 KHz to 1 MHz. Accordingly, the waveshape of the inductor current feedback signal will be preserved for peak current mode control.

Another aspect of the invention relates to a method for regulating a DC-to-DC converter 10 of the type as described above and comprising at least one power switch 11, a pulse width modulation circuit 16 for generating control pulses for the at least one power switch, an output inductor Lout connected to the at least one power switch, and a peak current control loop circuit 22 cooperating with the pulse width modulation circuit. The method preferably comprises the step of sensing current passing through the inductor using a current sensor 20 connected in parallel with the inductor. The current sensor 20 preferably comprises a resistor Rcs and a capacitor Ccs connected together in series. The method also preferably includes the step of operating the peak current control loop circuit 22 to control the at least one power switch responsive to the current sensor 20. The resistor Rcs and capacitor Ccs preferably have respective values so that the sensing step comprises sensing a substantially instantaneous current passing through the inductor.

The output inductor Lout has an inductance and a direct current (DC) resistance defining a first time constant. In one embodiment, the method also includes the step of selecting the resistor Rcs and capacitor Ccs of the current sensor 20 to define a second time constant within a predetermined range of the first time constant. The predetermined range may be plus or minus 10 percent at room temperature, or the first and second time constants may be substantially equal.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A DC-to-DC converter comprising:
   at least one power switch;
   a pulse width modulation circuit for generating control pulses for said at least one power switch;
   an output inductor connected to said at least one power switch;
   a current sensor connected in parallel with said inductor for sensing current passing through said inductor, said current sensor comprising a resistor and a capacitor connected together in series; and a peak current control loop circuit cooperating with said pulse width modulation circuit for controlling said at least one power switch responsive to said current sensor.

2. A DC-to-DC converter according to claim 1 wherein said resistor and capacitor have respective values so that said current sensor is a substantially instantaneous current sensor.

3. A DC-to-DC converter according to claim 1 wherein said output inductor has an inductance and a direct current (DC) resistance defining a first time constant; wherein said resistor and capacitor of said current sensor define a second time constant; and wherein the first time constant and the second time constant are within a predetermined range of each other.

4. A DC-to-DC converter according to claim 3 wherein said predetermined range is plus or minus 10 percent at room temperature.

5. A DC-to-DC converter according to claim 1 wherein said output inductor has an inductance and a direct current (DC) resistance defining a first time constant; wherein said resistor and capacitor of said current sensor define a second time constant; and wherein the second time constant is substantially equal to the first time constant.

6. A DC-to-DC converter according to claim 1 further comprising a voltage regulation loop circuit cooperating with said peak current control loop circuit for setting a peak current level.

7. A DC-to-DC converter according to claim 6 wherein said voltage regulation loop circuit comprises a voltage divider connected to the output of the DC-to-DC converter.

8. A DC-to-DC converter according to claim 1 wherein said pulse width modulation circuit operates at a predetermined switching frequency; and wherein said current sensor defines a sensing bandwidth substantially above the predetermined switching frequency.

9. A DC-to-DC converter according to claim 1 further comprising an overload protection circuit connected to said current sensor.

10. A DC-to-DC converter according to claim 1 wherein said at least one power switch comprises a high side power switch and a low side power switch connected together.

11. A DC-to-DC converter comprising:
at least one power switch;
a pulse width modulation circuit for generating control pulses for said at least one power switch;
an output inductor connected to said at least one power switch, said output inductor having an inductance and a direct current (DC) resistance defining a first time constant;
a current sensor connected in parallel with said inductor for sensing a current passing through said inductor, said current sensor having a second time constant within a predetermined range of the first time constant so that said current sensor is a substantially instantaneous current sensor; and
a peak current control loop circuit cooperating with said pulse width modulation circuit for controlling said at least one power switch responsive to said current sensor.

12. A DC-to-DC converter according to claim 11 wherein the predetermined range is plus or minus 10 percent at room temperature.

13. A DC-to-DC converter according to claim 11 wherein the second time constant is substantially equal to the first time constant.

14. A DC-to-DC converter according to claim 11 further comprising a voltage regulation loop circuit cooperating with said peak current control loop circuit for setting a peak current level.

15. A DC-to-DC converter according to claim 14 wherein said voltage regulation loop circuit comprises a voltage divider connected to the output of the DC-to-DC converter.

16. A DC-to-DC converter according to claim 11 wherein said pulse width modulation circuit operates at a predetermined switching frequency; and wherein said current sensor defines a sensing bandwidth substantially above the predetermined switching frequency.

17. A DC-to-DC converter according to claim 11 further comprising an overload protection circuit connected to said current sensor.

18. A DC-to-DC converter according to claim 11 wherein said at least one power switch comprises a high side power switch and a low side power switch connected together.

19. A DC-to-DC converter comprising:
at least one power switch;
a pulse width modulation circuit for generating control pulses for said at least one power switch;
an output inductor connected to said at least one power switch;
an instantaneous current sensor connected in parallel with said inductor for sensing an instantaneous current passing through said inductor; and
a peak current control loop circuit cooperating with said pulse width modulation circuit for controlling said at least one power switch responsive to said instantaneous current sensor.

20. A DC-to-DC converter according to claim 19 wherein said instantaneous current sensor comprises a resistor and capacitor.

21. A DC-to-DC converter according to claim 20 wherein said output inductor has an inductance and a direct current (DC) resistance defining a first time constant; wherein said resistor and capacitor of said instantaneous current sensor define a second time constant; and wherein the first time constant and the second time constant are within a predetermined range of each other.

22. A DC-to-DC converter according to claim 21 wherein said predetermined range is plus or minus 10 percent at room temperature.

23. A DC-to-DC converter according to claim 20 wherein said output inductor has an inductance and a direct current (DC) resistance defining a first time constant; wherein said resistor and capacitor of said instantaneous current sensor define a second time constant; and wherein the second time constant is substantially equal to the first time constant.

24. A DC-to-DC converter according to claim 19 further comprising a voltage regulation loop circuit cooperating with said peak current control loop circuit for setting a peak current level.

25. A DC-to-DC converter according to claim 24 wherein said voltage regulation loop circuit comprises a voltage divider connected to the output of the DC-to-DC converter.

26. A DC-to-DC converter according to claim 19 wherein said pulse width modulation circuit operates at a predetermined switching frequency; and wherein said current sensor defines a sensing bandwidth substantially above the predetermined switching frequency.

27. A DC-to-DC converter according to claim 19 further comprising an overload protection circuit connected to said instantaneous current sensor.

28. A DC-to-DC converter according to claim 19 wherein said at least one power switch comprises a high side power switch and a low side power switch connected together.

29. A method for regulating a DC-to-DC converter comprising at least one power switch, a pulse width modulation circuit for generating control pulses for the at least one power switch, an output inductor connected to the at least one power switch, and a peak current control loop circuit cooperating with the pulse width modulation circuit, the method comprising the steps of:

sensing current passing through the inductor using a current sensor connected in parallel with the output inductor, the current sensor comprising a resistor and a capacitor connected together in series; and operating the peak current control loop circuit to control the at least one power switch responsive to the current sensor.

30. A method according to claim 29 wherein the resistor and capacitor have respective values so that the sensing step comprises sensing a substantially instantaneous current passing through the inductor.

31. A method according to claim 29 wherein the output inductor has an inductance and a direct current (DC) resistance defining a first time constant; and further comprising the step of selecting the resistor and capacitor of the current sensor to define a second time constant within a predetermined range of the first time constant.

32. A method according to claim 31 wherein the predetermined range is plus or minus 10 percent at room temperature.

33. A method according to claim 29 wherein the output inductor has an inductance and a direct current (DC) resistance defining a first time constant; and further comprising the step of selecting the resistor and capacitor of the current sensor to define a second time constant substantially equal to the first time constant.

34. A method according to claim 29 further comprising a voltage regulation loop circuit cooperating with the peak current control loop circuit for setting a peak current level.

35. A method according to claim 29 further comprising an overload protection circuit connected to the current sensor.

* * * * *